United States Patent
Shen et al.

(10) Patent No.: US 7,151,854 B2
(45) Date of Patent: Dec. 19, 2006

(54) PATTERN RECOGNITION OF OBJECTS IN IMAGE STREAMS

(75) Inventors: Lance Lixin Shen, Tualatin, OR (US); Stephen K. Decker, Lake Oswego, OR (US); Clayton L. Davidson, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 421 days.

(21) Appl. No.: 10/237,142

(22) Filed: Sep. 5, 2002

(65) Prior Publication Data

US 2003/0086614 A1 May 8, 2003

Related U.S. Application Data

(60) Provisional application No. 60/335,427, filed on Nov. 30, 2001, provisional application No. 60/317,773, filed on Sep. 6, 2001.

(51) Int. Cl.
*G06K 9/46* (2006.01)
*G06K 9/48* (2006.01)
*G06K 9/20* (2006.01)

(52) U.S. Cl. .................. 382/203; 382/199; 382/317

(58) Field of Classification Search ............... 382/199, 382/203, 316, 317
See application file for complete search history.

(56) References Cited

U.S. PATENT DOCUMENTS

| | | | |
|---|---|---|---|
| 3,974,328 A | 8/1976 | Thomas et al. | |
| 5,864,742 A * | 1/1999 | Gasper et al. | 399/366 |
| 5,903,341 A | 5/1999 | Perry et al. | |
| 5,926,568 A | 7/1999 | Chaney et al. | |
| 6,005,670 A | 12/1999 | Coleman | |
| 6,044,171 A | 3/2000 | Polyakov et al. | |
| 6,141,033 A * | 10/2000 | Michael et al. | 348/25 |
| 6,229,522 B1 | 5/2001 | Reid | |
| 2002/0044689 A1* | 4/2002 | Roustaei et al. | 382/199 |

OTHER PUBLICATIONS

Baxes. Digital Image Processing: Principles and Applications. John Wiley & Sons, Inc., 1994, pp. 148-152.*
Baxes, Digital Image Processing: Principles and Applications, 1994, pp. 148-152.
Castleman, Digital Image Processing, 1996, pp. 459-460.

* cited by examiner

*Primary Examiner*—Vikkram Bali
*Assistant Examiner*—Colin LaRose
(74) *Attorney, Agent, or Firm*—Digimarc Corporation

(57) ABSTRACT

The disclosure describes pattern recognition detectors and software used to detect objects in image streams. The detectors operate on streams of image data, making them suitable for detecting certain types of objects in documents and images passed between processes and devices. For instance, the streaming mode detectors operate in printer drivers on streams of image data being passed to a printer. Also, the streaming mode detectors operate in scanner drivers on streams of image data being passed from a scanner. The disclosure describes pattern detectors for shapes with complex features as well as objects comprised of many smaller shapes. The disclosure also describes novel raster line and edge tracing pattern techniques.

22 Claims, 1 Drawing Sheet

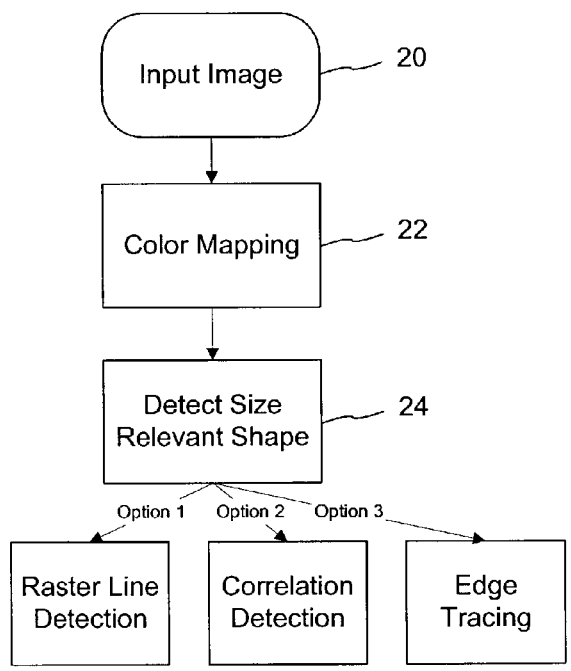
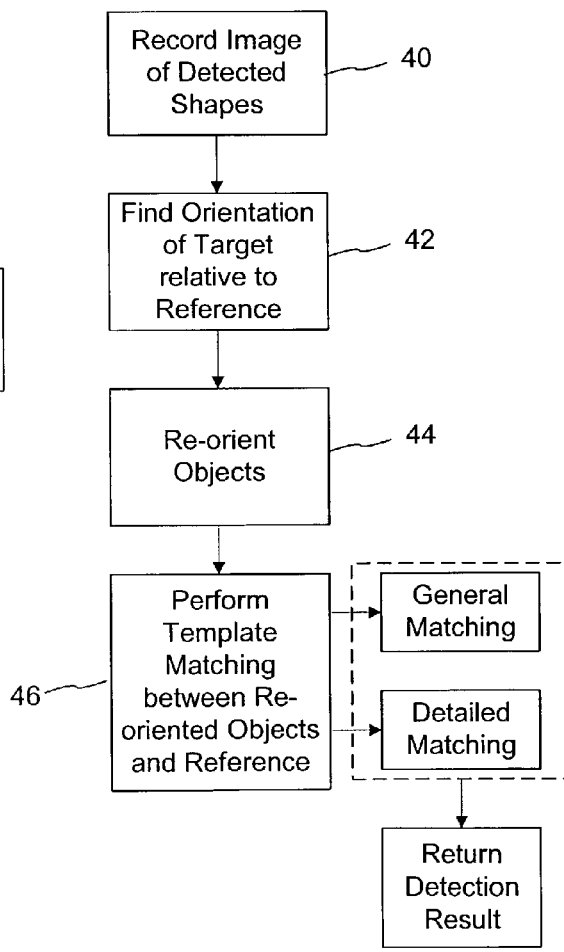
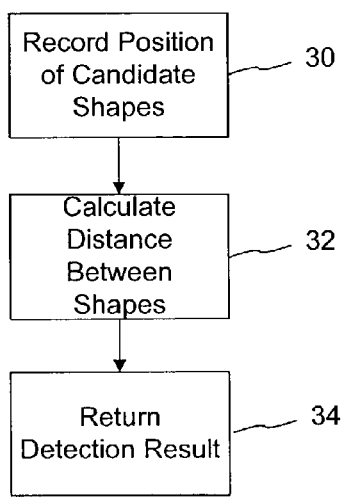

PATTERN RECOGNITION OF OBJECTS IN IMAGE STREAMS

RELATED APPLICATION DATA

This patent application claims priority to U.S. provisional patent application Nos. 60/317,773, filed Sep. 6, 2001, and 60/335,427, filed Nov. 30, 2001, which are hereby incorporated by reference.

TECHNICAL FIELD

The invention relates to pattern recognition, and particularly relates to pattern recognition of objects in image streams in printers, scanners, and other image editing devices and software.

BACKGROUND AND SUMMARY

Image pattern recognition refers to the study of automated systems and processes designed to recognize patterns in image data. Pattern recognition detectors are useful for a variety of applications, including automated inspection of objects and controlling the operation of machines.

One important application of pattern recognition is in imaging devices to detect documents or images of a particular type and controlling the operation of the imaging device based on detection of a particular pattern. Preferably, a pattern recognition detector in these applications must be efficient and use minimal memory so as to not interfere with the normal flow of image processing in the imaging device.

The invention provides methods and related software for recognizing image patterns in images. These methods are particularly adapted for efficiently detecting object patterns in image data streams received from an image scanner or sent to a printer from an application program in a personal computing system. These detector methods are also adapted for implementation in software drivers for printers and scanners. The detector is used to detect an image pattern associated with a particular type of document, such as a secure document including identification documents and bank notes. For these types of documents, the detector may be used to inhibit scanning or printing of the document, and/or trigger other usage control operations. The detector operates effectively on low resolution images, and minimizes the use of memory by temporally storing and operating on only small groups of scan line bands at a time. This enables the detector to operate on a stream of image data being sent to printer or intercepted from a scanner as the image is being printed or scanned. As such, the detector does not add significant processing complexity or memory requirements to the printing or scanning process. Also, by acting on an image stream during image capture or printing, actions taken in response to detecting a target object pattern can be taken before printing or scanning of an entire document is complete. In addition, the detector can be implemented as part of an operating system, device driver or other program, and can be used to scan digital image files, e.g., when a file is opened. While the methods are adapted for device control within printing and scanning environments, they may be used for other applications as well.

One aspect of the invention is a method for image pattern recognition for detecting an object in an image stream. This method temporarily stores a group of scan lines in the image stream. It transforms image pixels in the scan lines to a low resolution range and color space. It detects boundaries of size relevant candidate shapes in the transformed pixels. It then analyzes the candidate shapes to determine whether the candidate shapes satisfy predetermined criteria associated with a target object being sought. It controls the use of the image stream based on a result of analyzing the candidate shapes.

Another aspect of the invention is a method for image pattern recognition for detecting an object in an image. This method detects a candidate size relevant shape in the image, and performs edge tracing of the candidate size relevant shape to determine whether the candidate satisfies predetermined shape criteria. The edge tracing includes performing a water spreading method to trace a boundary of the candidate size relevant shape. This water spreading may include water filling or water draining to trace the boundary of the object.

Another aspect of the invention is a method for image pattern recognition for detecting an object in an image. This method detects a size relevant candidate shape in the image. The process of detecting the candidate shape includes scanning pixels along scan lines of the image to detect transitions in pixel values that satisfy predetermined criteria associated with the candidate size relevant shape, and repeating the scanning for consecutive scan lines to detect an estimate of a boundary of a candidate size relevant shape. The detecting further includes performing an initial detection of one or more size relevant candidate shapes in a sub-group of scan lines of a group of scan-lines and performing subsequent detection of the size relevant candidate shape in the group when the initial detection finds at least one size relevant candidate shape in the sub-group. The height of the sub-group of scan lines is less the height of a candidate shape being detected. The method only stores one of the groups of scan lines at a time to minimize memory used to detect the object. Finally, the method analyzes the candidate shape to determine whether the candidate shape satisfies predetermined criteria associated with a target object being sought.

Further features of the invention will become apparent with reference to the following detailed description and accompanying drawing.

BRIEF DESCRIPTION OF THE DRAWINGS

FIG. 1 is a flow diagram illustrating a process for detecting size relevant objects of a particular shape in an image.

FIG. 2 illustrates a process for detecting a pattern comprised of shapes at predetermined positions relative to each other.

FIG. 3 illustrates a process for detecting a pattern comprised of a particular shape with more complex shape components.

DETAILED DESCRIPTION

FIG. 1 is a flow diagram illustrating a process for detecting size relevant objects of a particular shape in an image. The pattern recognition detector module receives in image stream 20 as input. In typical implementations for detectors in printer or scanner drivers, the image stream arrives in sequential chunks, such as scan line bands, where each scan line is a linear array of color pixels, or chunks of image data (e.g., 32 KB or 64 KB chunks are typical in scanners. A band is a contiguous group of scan lines. Each pixel is represented as a color vector of 8 bits per color channel (Red, Green and Blue channels) at a particular spatial resolution (e.g., dot per unit area such as Dots Per Inch (DPI)).

To improve processing efficiency and reduce memory requirements, the detector re-samples the incoming image stream of scan lines to a target resolution in the range of 100 to 200 DPI (and at least stays within a range of 75 to 250 DPI). The detector module determines the spatial resolution of the stream of incoming image data from metadata supplied along with the stream (e.g., a file header provides the resolution in DPI) or from parameters supplied by the image source, such as an image editing application program, operating system, or digital scanner hardware device.

Initially, the detector transforms the color values of the incoming image into a target color channel for further processing as shown in color mapping block 22 of FIG. 1.

Next, the pattern recognition detector invokes one or more routines to detect size relevant objects of a particular shape as shown in block 24. Depending on the nature of the object and application, there are a number of alternative shape detection methods suitable for this stage of processing. Some examples of these methods include: raster line detection, correlation detection, and edge tracing.

A reference software implementation described further below detects predetermined shapes by detecting edge transitions along scan lines in scan line order, and recording edge positions from neighboring scan lines that are located at predetermined positions relative to each other according to the target object criteria. When the detector finds a sequence of scan lines with edges that satisfy this criteria, it stores the edge position information as being part of a candidate shape for further verification. As explained further below, the process preferably uses additional refinement stages to check the candidate shapes against additional criteria to reduce false positives.

The raster line detection method operates efficiently because it accumulates information about candidate shapes and triggers more detailed verification only when the accumulated information indicates that a desired shape is likely present. In an implementation for a circle for example, the detector begins accumulating edge data for a candidate shape when the top of a circle is detected based on an observation of an edge transition characteristic expected for the top of a circle (e.g., a positive edge transition followed by a negative edge transition with no other surrounding edge transitions). Thereafter, the detector accumulates edge transition data for subsequent scan lines (e.g., pairs of positive and negative edge transitions representing the intersection of the scan line with a circle boundary, with center positions between each of the edge transition pairs along a straight vertical line). Further verification is triggered if the edge data for a subsequent scan line shows characteristics of the bottom of the circle (e.g., similar to the top of the circle).

A related approach for larger circle detection is to perform similar edge detection based on transitions in pixel values, and for each edge transition pair in neighboring scan lines, accumulate a mapping of the center location of a candidate circle with a boundary through the edge locations and known radius, R. The detector calculates the center location for each edge pair based on a known radius, R, of the target object, and the location of the two boundary points at the edge transitions on the scan line. If the center location for the edge data of neighboring scan lines maps to roughly the same center point, then the detector triggers further detector actions, such as those shown in FIG. 3. In this particular case, clearance around the circle is a pre-condition to finding each edge transition.

The detection block 24 produces a set of one or more detected shapes and shape locations (e.g., pixel coordinates). At this stage, the pattern recognition process takes one of two paths, depending on the nature of the object being detected. If the target object being detected is comprised of a set of predetermined shapes at known distances relative to each other, then the detector proceeds as shown in FIG. 2. If the target object is comprised of a particular boundary shape with particular internal shape components, then the detector proceeds as shown in FIG. 3.

FIG. 2 illustrates a process for detecting a pattern comprised of shapes at predetermined positions relative to each other. For this type of pattern, a pattern matching process evaluates the relative location of the shapes detected in the object detection stage shown in FIG. 1. First, it records the position of the shape and size relevant objects (30), and then calculates the distance between the shapes (32). If the distance between the shapes matches the target pattern criteria, then the pattern matching process returns a positive detection result (34), which leads to further refinement to reduce false positives. When there are more than two or three shapes in the target pattern, an efficient approach for finding the pattern is to begin using two shapes to locate the center of the pattern, and then use the distance and angle to the center to evaluate the position of other shapes in the pattern FIG. 3 illustrates a process for detecting a pattern comprised of a particular shape (e.g., an outer boundary), with particular internal shape components. For this type of object, the object detection stage shown in FIG. 1 detects candidate objects based on the shape of the boundary of the candidate object. After the boundary shape detection process of FIG. 1, the process shown in FIG. 3 records an image of the detected, shape relevant objects (40). It then finds the orientation of each detected object (42) relative to a reference object by using template matching to find the rotation of the detected object that provides the highest correlation with the reference object. It then rotates the object to approximate its original orientation (44).

As an alternative to template matching to determine rotation angle, the moments of the candidate object may be used to derive its rotation. This approach starts in a similar fashion by finding the boundary of candidate objects that have a desired boundary shape. The method then segments each candidate object from the surrounding background at its boundary leaving only the image inside the boundary and processes the segmented image of each candidate individually. Focusing on a particular candidate object, the method finds the object's centroid, and then computes its moments. Based on these moments, it derives the object's rotation angle. This rotation angle is then used to re-orient the object.

Returning to FIG. 3, the method performs template matching between the re-oriented detected object and a reference object (46). The template matching process subdivides the matching process into parts, including a general matching stage where a subset of a reference template representing significant parts of the target object is matched with the detected object, and a detailed matching stage where the entire reference template is matched with the detected object. If the general matching stage yields a positive detection result, the template matching process proceeds to match the entire reference template with the detected object. Additional correlation stages and/or point-by-point pixel matching between a reference and detected object may be used to verify an accurate detection. Similarly, color data may be used to verify the presence of a target object.

To illustrate a pattern recognition process in more detail, consider the following reference implementation. This implementation is optimized to reduce computational complexity and memory usage. First, to reduce memory requirements and increase signal to noise ratio, the pattern recognition process converts the incoming 24 bit color values to 8 or even 1 bit color values in a color channel of the object being detected. The reference implementation maps the 24 bit RGB color values to 8 bit color values (e.g., to an 8 bit blue channel).

This color mapping transform is based on a color specification of the target object being detected or a color specification derived from color measurements of actual target objects. This color specification provides the color channel into which the incoming color data will be mapped and pattern recognition performed. After the color mapping process, the target object being detected should remain, if present, while objects of a different color in its background are suppressed.

Another optimization is re-sampling the input image to a low resolution image in the range of, for example, 100–200 DPI. This reduces the memory requirements to store incoming scan line groups. To sample the image, a form of interpolation may be used. For example, one approach is to convolve an anti-aliasing filter with the image to sample the image at the desired spatial resolution while reducing sampling artifacts. One form of sampling suitable for the application is bi-cubic interpolation. Other forms of sampling filters may be used as well. The sampling routine may be designed to map all images to a target resolution, such as 150 DPI, where further detection operations are performed. Alternatively, the sampling routine may map the incoming image data to a particular resolution within the desired low resolution range depending on the resolution of the incoming image data (e.g., down-sample a 400 DPI image to 200 DPI, leave a 100 DPI image at 100 DPI, and down-sample a 300 DPI image to 150 DPI, such that the down-sampling is performed at integer multiples to get the image into the low resolution range). In either case, the parameters of the target object, such as the radius of the object being detected, are adjusted to be compatible with the resolution of the sampled image data.

The reference implementation chooses an integral down-sampling ratio to down-sample to a variable resolution, and down-samples pixels by averaging neighboring pixels together and replacing the pixels in the neighborhood with the average value.

To reduce memory requirements further, the entire detection process operates on a small group of neighboring scan lines from the image stream, where the number of scan lines is selected so that the total height of the group of scan lines is 1.5 times the height of the target object being detected at a particular spatial resolution. When the shape detector has completed processing of one group of scan lines from the stream, the detector frees memory used to store this group of scan lines for a subsequent group in the stream.

More specifically, the reference implementation operates on a group of scan lines that includes three sections of scan line sub-groups called "bands." The height of each band is 0.5 times the height of the target object being detected, and the sum of the three contiguous bands is 1.5 times the height of the target object. The reference implementation performs shape detection for shapes that form part of a pattern on only one band (0.5 times the height of the target object) at a time. This band is the lowest band in the three band group available to the detector. When the detector has completed shape detection on that lowest band, it advances the lower two bands to the top of the group, the oldest band at the top is effectively deleted, and a new band is fed into the bottom section to continue processing. This is a preferred way to save memory consumption.

This form of band processing used in the reference implementation enables processing of image streams in printer and scanner drivers and image editing programs. For example, the streaming mode detection software executes as part of a printer or scanner driver that monitors a stream of image data to or from the device, and passes a band of image data to the detector each time a sufficient amount of data has been received to fill an entire band. The software then commences detection operations as each new band becomes available.

For the case where the target object is a collection of constituent shapes, the height of each band is less than the height of the target object (e.g., about one-half the height of a target object), but greater than the height of the constituent shapes. The implementation performs the shape detection process of FIG. 1 on a band of scan lines, and only uses additional bands if size relevant shapes have been detected within the band. In particular, the detector uses the two previous bands to perform additional detection of the target object as shown in FIG. 2 in the case where size relevant shapes have been detected in the first stage. The detector proceeds to process one band at a time and only looks to the previous two bands if necessary. At most, the detector needs to store only three bands in this implementation. The three bands are stored temporarily and the oldest band is discarded with each new band that is processed according to the first stage.

In the reference implementation, the shape detection routine uses a form of efficient edge detection for a size relevant circle shape that operates along scan lines. This routine evaluates local changes in values of neighboring pixels along a scan line to detect edge transitions of a size relevant circle boundary in the scan line. The routine classifies neighboring pixels along scan lines into groups depending on whether they represent an up or down transition in value, and also records the center position along a scan line between a pair of edge transitions. The routine determines whether a desired shape is present by determining whether there is a sequence of these edge transition groups at predetermined positions relative to each other in neighboring scan lines. For a circle shape, the center position for pairs of edge transitions in neighboring scan lines will roughly form a straight vertical line, orthogonal to the scan line direction. When initial evidence of a circle shape is detected based on edge transitions in a first scan line, the routine tracks edge transitions in the local area around these edge transitions in subsequent scan lines so long as the center position between those edge transitions forms a straight vertical line (namely, orthogonal to the scan line).

The reference implementation is designed to operate on low resolution images, e.g., in the range of 100 to 200 DPI. At low resolutions, edge transitions may occur more slowly, and as such, need to be analyzed across a group of more than two adjacent pixels along a scan line. For example, in a 100 DPI image, a predetermined change of pixel level (e.g., a change in pixel value in a range from 20 to 50 in an 8 bit pixel value from 0–255) is used to establish whether an edge transition is present across one or two neighboring pixels. This enables edge detection to operate effectively within low resolution images.

This edge detection routine provides an efficient method to make a preliminary determination about the presence of a particular shape, and to provide the candidate shape's location.

The shape detection routine performs a number of tests to verify that a candidate shape satisfies criteria of the target pattern. These tests include checking the width and height of the candidate, checking whether the shape is symmetrical about a vertical line, and checking the color at specified points on the shape (e.g., on the shape's edge) to ensure that the color is within desired tolerances of the color specification for the target pattern.

The implementation then performs a more rigorous test to verify that the candidate shapes meet expected criteria associated with the target shape being sought. The reference implementation performs additional shape detection pre-processing before proceeding to the process of FIG. 2. In particular, it evaluates each candidate shape by counting the number of candidate shapes detected in a local area centered at the candidate shape. If the number of candidate shapes within the local area around the candidate shape exceeds a threshold, then the candidate shape is discarded. This verification process is particularly useful in low resolution images in the range of 100 to 200 DPI because it reduces the number of false candidate shapes in some images. These false candidate shapes slow down processing in the next stage. Since the target objects have a pre-determined number of shapes in a neighborhood, false candidates can be identified and eliminated when more than the pre-determined number of candidate shapes are detected within the neighborhood.

The implementation determines the density of candidate shapes per local area by convolving a window of a uniform window function over the image portion being analyzed and summing the candidate shapes in the window. As a uniform window function is used, the convolution function can be performed efficiently.

Next, moving to the process shown in FIG. 2, the reference implementation measures the distances between the remaining neighboring shapes. It then forms selected shapes into groups of shapes, where each group now represents candidate objects according to the target object criteria. The target criterion specifies the distances and angles between shapes and the number of shapes in a local area. Each candidate object comprises a predetermined number of constituent shapes detected in the process shown in FIG. 1, and specifically described above for the reference implementation. At this stage, the implementation saves data for candidate objects that have a desired number of constituent shapes with at least some subset of those shapes in the correct position as specified by the target criteria. The reference implementation uses two shapes to first locate the center of the target. Then, it evaluates the position of other shapes by the distance and angle to the center.

The pattern recognition detector then proceeds to perform additional verification of the candidate objects to reduce false positives. A variety of criteria may be used for verification, including verifying the shape of the boundary of the constituent shapes that form the candidate object, verifying the size of the constituent shapes, verifying the relative positions and distance among the constituent shapes, and verifying the color attributes at the pixels along the boundaries of the constituent shapes.

For example, the reference implementation uses an edge tracing method to analyze boundary pixels in the candidate shape relative to the neighbor pixels. In the edge tracing method, the software walks around the boundary of a constituent shape in a candidate object to verify that the boundary approximates a circle, or other desired shape. If the desired shape is indeed present, then the boundary pixels of the candidate shape will have a predetermined relationship with neighboring pixels.

One novel type of edge tracing method used in the implementation can be described as a "water-filling" method. This method starts at predetermined pixel location on a candidate shape. In particular, this location is roughly centered on an edge of the candidate shape. Next, neighboring pixel locations bordering this start location on either side are set to maximum values (e.g., maximum water levels). The water-filling method then spreads water from the start location in one direction (either up or down) by establishing a starting level value and determining whether neighboring pixel locations have values that are at or below that level. If so, the neighboring pixels are deemed part of the shape being traced.

There are two operations in the water filling method: water spreading, and water raising. If the neighboring pixels all have higher pixel levels, then the water level has to be raised to continue the spreading process. The starting water level is the pixel value of the starting pixel. The method starts by looking at pixel locations in three directions from the start location. In particular, starting upward, the spreading operation checks the pixel value at the top-left, top, and top right pixel locations. After moving from the starting location, the spreading operation checks all eight directions, namely all eight neighboring pixels in a three by three neighborhood.

The starting location for each subsequent iteration of the spreading operation is the neighboring pixel value with the lowest pixel value. The water filling process toggles between spreading water and raising the water level for a number of iterations until either: 1. the water spreads back to the original pixel from the other direction (opposite to the direction from which the water starts filling); or 2. the water spills away from the shape. In case 2, the shape is discarded. Sorting the pixels in the neighborhood of the shape by pixel value can significantly increase the efficiency of the tracing process.

Next, from the starting location and with help of the two neighboring pixels whose value has been set to maximum value in the water filling process, the tracing routine traces and records the inner and outer boundaries around the water filled pixels. The boundaries are represented with a chain code, which comprises an array of direction codes identifying the direction from each boundary pixel to the next beginning at the starting location. Each chain code is represented as a number (e.g., 1 to 8) representing one of the possible directions. These inner and outer boundaries define the shape of the shape candidate.

Next, the tracing routine validates the shape of the inner and outer boundaries of the group of pixels formed by the water-filling process. The tracing routine uses the chain code of the two boundaries to check the shape. If the direction of the boundary deviates from predetermined criteria, the tracing routine discards the shape as a potential candidate.

For additional verification, the reference implementation checks the size and position of the candidate shapes within a candidate object, and re-verifies the distance among the constituent shapes measured using the refined shape positions relative to the criteria established for the target object. To check the size, the reference implementation forms an outer bounding rectangle for the outer boundary and an inner bounding rectangle for the inner boundary of a constituent shape in a candidate object. It then determines the size from the size of these bounding rectangles and determines whether the size falls within desired criteria. If it does, the candidate shape is kept as part of the candidate object; otherwise, it is discarded.

There are a number of possible tests to verify a group of shape candidates that form a candidate object. One test is to check whether attributes of shape candidates are consistent with each other. For example, the highest water level established in the tracing routine for selected candidate shapes of a candidate object must fall within a threshold tolerance of each other to be valid. Alternatively, the average value of the boundary pixels for selected candidate shapes of a candidate object must fall within a predetermined tolerance of each other to be valid.

An additional verification is to check the color of the pixels along the boundaries of the candidate shapes. This verification requires the pattern recognition to retain color information (24 bit color) for the shapes detected in the initial shape detection stage shown in FIG. 1 or for the entire band for this later color verification process. The color verifier checks the color values against the color specification for the target object to verify that the detection is valid.

One method for checking color is to register each pixel's color on the boundary of a candidate shape, and determine the extent to which these pixels have the same color. For example, in order to be valid candidates, the percentage of boundary pixels having the same color has to exceed a predetermined threshold, which is determined by experimentation to reduce false positives.

As an additional verification process, the image portions that have valid candidate objects after all of these checks can be returned to the shape detection stage, where the shape detection criteria are made less restrictive. Then, the shape detection and subsequent verification tests are repeated. Candidate objects with more than predetermined number of candidate shapes are discarded as candidates.

As noted, the detector can verify whether a candidate object is the target object by checking attributes of the individual constituent shapes of the candidate. One approach is to allow a predetermined number of candidate constituent shapes in the scope of the target in the first stage (FIG. 1). This number is bigger than the number of shapes, N, in the target object. At the last stage of the verification process, a candidate object will have N constituent shapes in the correct positions, but may also have an additional number in the wrong positions. These additional shapes are still within the allowed scope of the candidate object. After the detector verifies the N shapes in the right positions being correct in shape and color, both individually and as a group with certain consistency, it then analyzes the extra candidate shapes. The detector checks if these extra shapes can individually pass the size and color check (e.g., including edge tracing verification). If any of them pass this individual check, the detector checks if any of them fit into the other N candidate shapes in the correct positions. If any of these extra candidate shapes fit in the correct positions, the detector rejects the candidate object as being invalid.

For candidate objects that only have N candidate shapes, this additional verification is not necessary, and the detector skips it. However, as noted, the detector loosens the criteria and checks if there are additional candidate shapes within the scope of the candidate object. This loosening of the criteria may cause the detector to detect more constituent shapes in the allowable scope of a candidate object, and thus, trigger verification of the additional candidate shapes.

These additional verification stages are particularly useful in accurately detecting target objects comprising a collection of small shapes in low resolution images in the range of 100 to 200 DPI. In these types of low resolution images, the constituent shapes may be less than 5–6 pixels wide.

In an alternative implementation, the pattern detector uses Fourier descriptors to help identify target patterns in an image from among a set of candidate objects detected in the image. In this implementation, the pattern detector begins by mapping the input image into a binary image. For example, a selected color or color values per pixel are mapped to a binary value. The detector uses color mapping, edge detection and thresholding to set pixels having a desired color or color relationships with its neighbors to a binary value of one, and all other pixel values to zero. The color map performs a linear combination of the R, G, B values of a pixel to map them to a single multi-level value (e.g., 8 bit). An edge detection routine transforms the resulting pixel values into edge characteristic values by performing local edge detection on a neighborhood around each pixel. Finally, a thresholding process compares the edge characteristic value to a threshold to map the value to a one or zero. This process of mapping the color pixels to binary values may implemented using adaptive thresholding on pixel neighborhoods around each pixel location to convert the color values at each location to a binary value as a function of color values and relationships between values of neighboring pixels.

Next, using a scan line approach, the detector identifies groups of edge pixels that satisfy a predetermined shape characteristic. When the detector finds a group of contiguous scan lines in which neighboring edge pixels form the desired shape characteristic, it triggers a boundary tracing routine.

The boundary tracing routine uses a technique such as the one chain code approach described previously that steps along the edge to ensure that the boundary pixels form a shape within predetermined constraints for that shape.

The pattern detector then computes a Fourier Descriptor of the candidate objects that satisfy the criteria of the tracing routine. The Fourier Descriptors comprise scale, rotation, and translation invariant features of the candidate objects. The detector analyzes the Fourier Descriptors to further check whether the candidate object satisfies predetermined criteria. If so, further detection operations, such as the ones described previously, can be used to identify valid target objects within the candidate objects. This method operates in a streaming mode on bands or chunks of image data, and can be integrated with the techniques described above to detect objects of varying shapes.

The pattern recognition detector operates on image streams to detect objects in the stream as it moves from one device or software process to another. This enables the detector to be used in printer and scanner device drivers, operating systems, image editing programs, and imaging hardware (e.g., digital image scanners, printers, copiers, fax machines, and multi-function imaging devices). It is particularly useful for analyzing digital image data passed between process and devices to check for certain types of documents and to control the uses of the documents or the rendering of the image data in the image stream.

The above detector software may be integrated with other types of detector software or hardware, such as digital watermark detector software or hardware. In such an implementation, both the pattern recognition and digital watermark detectors operate on streaming image data. For more information on streaming mode detection, see U.S. patent application Ser. No. 09/659,125 (now U.S. Pat. No. 6,952,485) entitled WATERMARK ENCODING AND DECODING IN PERIPHERALS AND PERIPHERAL DRIVERS, filed Sep. 11, 2000, which is hereby incorporated by reference.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the pattern recognition processes may be implemented in a programmable computer or a special purpose digital circuit. Similarly, pattern recognition tools described above may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method for image pattern recognition for detecting an object in an image stream comprising:
   temporarily storing a group of scan lines in the image stream;
   transforming image pixels in the scan lines to a low resolution range and color space;
   detecting boundaries of size relevant candidate shapes in the transformed pixels;
   analyzing the candidate shapes to determine whether the candidate shapes satisfy predetermined criteria associated with a target object being sought; and
   controlling use of the image stream based on a result of analyzing the candidate shapes.

2. The method of claim 1 wherein detecting boundaries comprises analyzing transitions in values of the transformed pixels along scan lines to detect groups of edges of size relevant shape boundaries.

3. The method of claim 1 wherein analyzing the candidate shapes includes performing edge tracing of the candidate shapes to determine whether the candidate shapes satisfy predetermined shape criteria.

4. The method of claim 3 wherein the edge tracing includes tracing a boundary using a water spreading method.

5. The method of claim 1 wherein the method performs an initial detection of size relevant candidate shapes in a sub-group of scan lines of the group and performs subsequent detection of the size relevant candidate shapes in the group when the initial detection finds at least one size relevant candidate shape in the sub-group, the height of the sub-group of scan lines is less than the height of the target object being detected, and the method only stores one group of scan lines at a time to minimize memory used to detect the object.

6. The method of claim 5 wherein the group is sub-divided into two or more sub-groups, and as a new sub-group is temporally stored by the method, the oldest sub-group that has previously been stored by the method is discarded, such that the method successively analyzes one group of scan lines from the image stream at a time to detect the object.

7. The method of claim 1 wherein the method is implemented as part of digital image scan process and is used to inhibit scanning when the object is detected.

8. The method of claim 7 wherein the method is implemented in a software driver for a digital image scanner.

9. The method of claim 1 wherein the method is implemented as part of a printing process and is used to inhibit printing when the object is detected.

10. The method of claim 9 wherein the method is implemented as part of a software printer driver for a printer.

11. The method of claim 1 wherein analyzing the candidate shapes includes computing a Fourier descriptor of a candidate shape, and determining whether the Fourier descriptor satisfies predetermined criteria associated with the object.

12. A computer readable medium on which is stored instructions for performing the method of claim 1.

13. A method for image pattern recognition for detecting an object in an image comprising:
    detecting a candidate size relevant shape in the image; and
    performing edge tracing of the candidate size relevant shape to determine whether the candidate satisfies pre-determined shape criteria, the edge tracing including performing a water spreading method to trace a boundary of the candidate size relevant shape; wherein the method is performed during a printing or scanning operation and inhibits the printing or scanning operation when the object is detected in the image.

14. The method of claim 13 wherein the method is implemented in printer or scanner software driver.

15. A method for image pattern recognition for detecting an object in an image comprising:
    detecting a candidate size relevant shape in the image; and
    performing edge tracing of the candidate size relevant shape to determine whether the candidate satisfies pre-determined shape criteria, the edge tracing including performing a water spreading method to trace a boundary of the candidate size relevant shape; wherein the method performs an initial detection of one or more size relevant candidate shapes in a sub-group of scan lines of a group of scan-lines and performs subsequent detection of the size relevant candidate shape in the group when the initial detection finds at least one size relevant candidate shape in the sub-group, the height of the sub-group of scan lines is less than the height of the object being detected, and the method only stores one group of scan lines at a time to minimize memory used to detect the object.

16. The method of claim 15 wherein the group is sub-divided into two or more sub-groups, and as a new sub-group is temporally stored by the method, the oldest sub-group that has previously been stored by the method is discarded, such that the method successively analyzes one group of scan lines from the image at a time to detect the object.

17. A method for image pattern recognition for detecting an object in an image comprising:
    detecting a size relevant candidate shape in the image, including scanning pixels along scan lines of the image to detect transitions in pixel values that satisfy predetermined criteria associated with the candidate size relevant shape, and repeating the scanning for consecutive scan lines to detect an estimate of a boundary of a candidate size relevant shape;
    wherein the detecting further includes: performing an initial detection of one or more size relevant candidate shapes in a sub-group of scan lines of a group of scan-lines and performing subsequent detection of the size relevant candidate shape in the group when the initial detection finds at least one size relevant candidate shape in the sub-group, the height of the sub-group of scan lines is less than the height of the object being detected, and the method only stores one group of scan lines at a time to minimize memory used to detect the object; and analyzing the candidate shape to determine whether the candidate shape satisfies predetermined criteria associated with the object being sought.

18. The method of claim 17 wherein the group is subdivided into two or more sub-groups, and as a new sub-group is temporally stored by the method, the oldest sub-group that has previously been stored by the method is discarded, such that the method successively analyzes one group of scan lines from the image at a time to detect the object.

19. The method of claim 17 wherein the method is implemented as part of a printing or scanning process and the method inhibits printing or scanning when the object is detected.

20. The method of claim 17 wherein analyzing the candidate shape includes edge tracing.

21. The method of claim 20 wherein edge tracing includes performing a water spreading method to trace a boundary of the candidate size relevant shape.

22. The method of claim 21 wherein the edge tracing method includes iteratively:

adjusting a water level representing a pixel value at a pixel location on or near the boundary, and comparing a pixel value at one or more neighboring pixel locations with the water level to identify pixel locations located along the boundary of the candidate size relevant shape.

* * * * *